(No Model.)
G. WILSON.
CONNECTION FOR CRANKS.
No. 577,701. Patented Feb. 23, 1897.
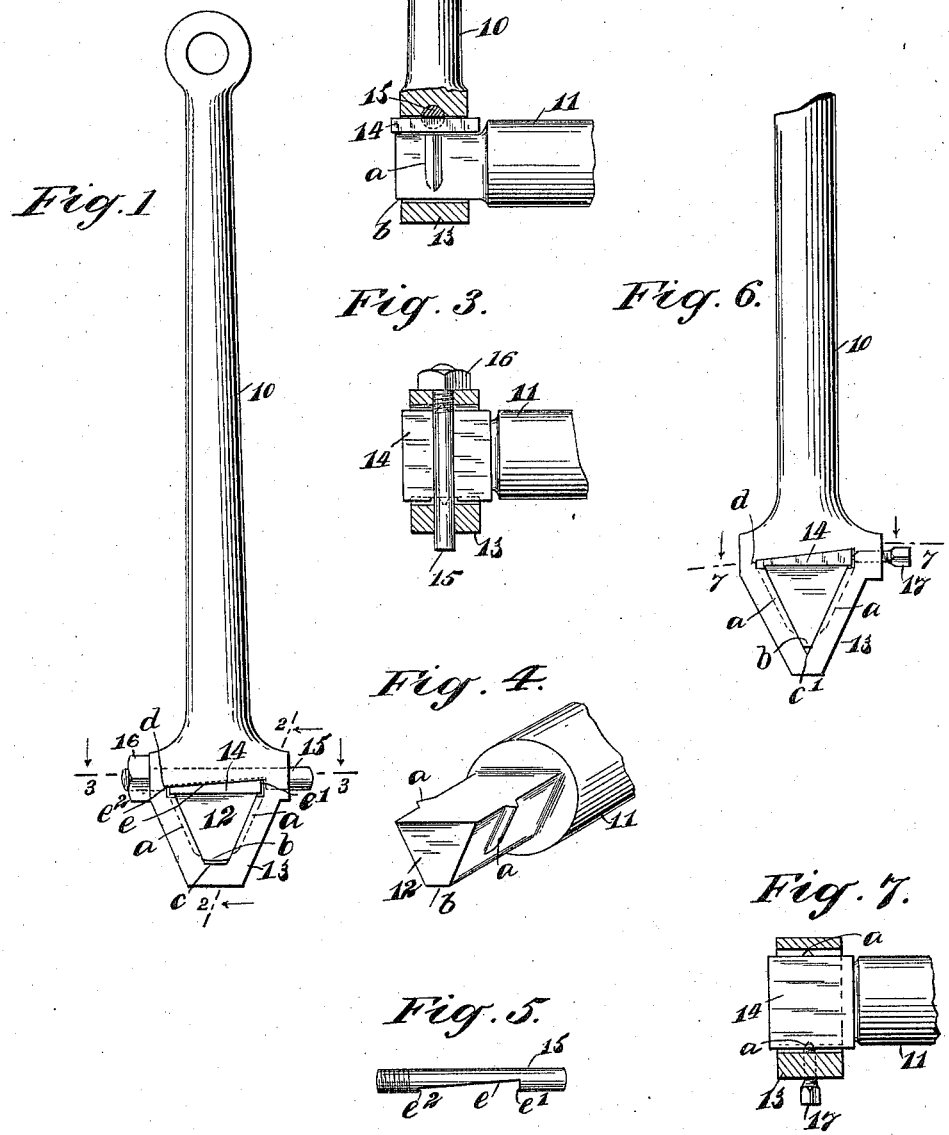
WITNESSES:
L. N. Legendre
Wm. T. Patton
INVENTOR
G. Wilson.
BY
ATTORNEYS.

UNITED STATES PATENT OFFICE.

GEORGE WILSON, OF MADELIA, MINNESOTA.

CONNECTION FOR CRANKS.

SPECIFICATION forming part of Letters Patent No. 577,701, dated February 23, 1897.

Application filed April 8, 1896. Serial No. 586,647. (No model.)

*To all whom it may concern:*

Be it known that I, GEORGE WILSON, of Madelia, in the county of Watonwan and State of Minnesota, have invented certain new and useful Improvements in Connections for Cranks, of which the following is a full, clear, and exact description.

This invention relates to attachments for cranks to driving-shafts, and more particularly to connections for the crank-arms of a bicycle with the driving-shaft of motor-gearing therefor.

The object of my invention is to provide novel, simple, and efficient means for detachably connecting the crank-arms of a bicycle or like vehicle with the driving-shaft which will secure lightness, strength, durability, and convenience of adjustment for such attachments, and also enable the production of a neat, reliable, shapely, and inexpensive device of the indicated character.

The invention consists in the novel construction and combination of parts, as is hereinafter described, and pointed out in the claims.

Reference is to be had to the accompanying drawings, forming a part of this specification, in which similar characters of reference indicate corresponding parts in all the figures.

Figure 1 is a side view of a crank-arm, showing the end of an attached shaft and the novel connecting device for the arm and shaft in preferred form. Fig. 2 is a transverse sectional view substantially on the line 2 2 in Fig. 1. Fig. 3 is a transverse sectional view essentially on the line 3 3 in Fig. 1. Fig. 4 is a detached perspective view of an end portion of a driving-shaft having features of the improvement. Fig. 5 is a detached perspective view of a locking-bolt that is a novel detail of construction. Fig. 6 is a side view in part of a crank-arm on the end of a driving-shaft, showing a slightly-modified means for securing said parts together; and Fig. 7 is a transverse sectional view of the modification substantially on the line 7 7 in Fig. 6.

The embodiment of my invention represented in the drawings shows the improvements applied for the detachable connection of a crank-arm 10 with an end portion of a driving-shaft 11. As most clearly represented in Fig. 4, the shaft-body 11 is rendered substantially triangular for a short distance on its end portion, and preferably said part 12, that for convenience is termed the "stub end," has the angular portion that is opposite the body of the crank-arm flattened.

In the process of manufacture two integral splines $a$ are oppositely formed on two converged sides of the stub end 12 at a suitable distance from its free end, these extending toward the flattened corner $b$ of the stub end.

There is a substantially triangular hub 13, formed on one end of the crank-arm 10, which hub is suitably apertured to receive the stub end 12, and the corners of the aperture are so disposed that one flattened corner $c$ will lie in the same plane with the longitudinal axis of the crank-arm. There are two grooves formed in the walls of the hub-aperture, which inclose the flat corner $c$ at such points as will adapt the grooves to receive the splines $a$ when the hub 13 and stub end 12 are connected. Opposite the corner $c$ there is a recess $d$, formed so as to widen the hub-aperture, and the defining-wall of said recess is inclined from one side wall of the hub to the opposite side of the same, as appears in Figs. 1 and 6.

The degree of divergence given to the sides of the aperture in the hub 13, which inclose the flat corner $c$, adapts them to intimately contact with the sides of the stub end that define the corner $b$, when the stub end 12 is inserted within the aperture of the hub and its corner $b$ pressed toward the flat corner $c$, as shown in Fig. 1. The stub end 12 being substantially triangular in cross-section it will be evident that by provision of the recessed enlargement of the aperture in the hub 13, which elongates said aperture in direction of the arm 10, the stub end may be introduced if it is held away from the corner $c$, and the ribs or splines $a$ may then be entered within the mating grooves formed in the inclined walls of the hub-aperture when the stub end is pressed toward said angle, whereby the stub end will be locked to the hub, while the converging sides of the stub end have contact with the adjacent walls of the aperture in the hub.

To secure the hub of the crank-arm 10 in locked engagement with the stub end 12, a wedge-block 14 is provided, which is shaped to nearly fill the recess provided in the hub-aperture that is located adjacent to the body of the crank-arm and is vacant when the stub end is pressed toward the corner $c$ of the hub-aperture.

The preferred means for locking the wedge-block 14 in the recess $b$ and adjusting it longitudinally, so as to key the stub end 12 fast to the hub 13, consists of the bolt 15, that is cylindrical and has one side $e$ cut away, so as to flatten it and produce an open recess terminated by two shoulders $e'$ $e^2$. (Plainly shown in Fig. 5.)

The key-bolt 15 is inserted in a perforation transversely formed in the stub end 13 at a point which will permit the shoulders $e'$ $e^2$ on it to loosely contact with the opposite edges of the wedge-block 14, respectively at the thick and thin ends of said block. A nut 16 is screwed on the threaded end of the key-bolt which is nearest the shoulder $e^2$, and it will be seen that the adjustment of said nut will control the wedge-block to tighten or release the stub end 12.

In Figs. 6 and 7 the construction of parts is substantially the same as has been described; but the corner $c'$ in the hub 13 is made angular instead of being flattened, and the corner $b$ of the stub end is but slightly flattened, the effect being the same as already indicated for the preferred form of construction.

In the modification a set-screw 17 is substituted for the key-bolt 15, said screw engaging a tapped hole formed in the side of the hub 13 opposite the thicker end of the wedge 14, so that an adjustment of the set-screw, which will cause it to press the wedge-block toward the other end of the recess $b$, will lock the stub end 12 firmly within the hub 13 of the crank-arm 10.

Having thus described my invention, I claim as new and desire to secure by Letters Patent—

1. The combination with a shaft having a stub end of substantially triangular formation, and provided with opposite splines on the converging sides of said stub end, of a crank-arm having an essentially triangular hub-aperture grooved in its walls to receive the splines, and a device for pressing the splines into said grooves and locking the crank-arm and shaft together, substantially as described.

2. The combination with a shaft having a substantially triangular stub end, the converging sides of said stub end having opposite integral splines thereon, of a crank-arm, the hub of which is apertured to loosely receive the stub end, the converging walls of said aperture being grooved and adapted to receive the splines and permit the converging walls of the stub end having said splines to contact with the grooved walls of the hub-aperture, a wedge-block occupying a recess formed in the aperture in the hub next the crank-arm, and means for longitudinally moving the wedge-block, substantially as described.

3. The combination with a shaft having a substantially triangular stub end, two converging sides of said stub end having integral splines thereon, of a crank-arm, the hub of which is apertured to loosely receive the stub end, two converging walls of said aperture being grooved and adapted to receive the splines and permit the converging walls of the stub end having said splines to closely contact with the grooved walls of the hub-aperture, a wedge-block located in a recess in the hub, said recess having a transverse sloping top wall and being located opposite one corner of the hub, and a key-bolt having a recess on one side and threaded at one end, said bolt passing through the hub above the wedge-block, shoulders on said key-bolt at the ends of the recess therein and engaging the wedge-block, and a nut on the threaded end of said key-bolt, substantially as described.

GEORGE WILSON.

Witnesses:
JOSEPH J. KEBER,
CHAS. R. WELDON.